United States Patent [19]

Cinotti

[11] Patent Number: 5,112,569
[45] Date of Patent: May 12, 1992

[54] INTRINSIC-SAFETY NUCLEAR REACTOR OF THE PRESSURIZED WATER TYPE

[75] Inventor: Luciano Cinotti, Genoa, Italy

[73] Assignee: Ansaldo S.p.A., Genoa, Italy

[21] Appl. No.: 407,661

[22] Filed: Sep. 15, 1989

[30] Foreign Application Priority Data

Sep. 15, 1988 [IT] Italy .................. 12545 A/88

[51] Int. Cl.⁵ .............................................. G21C 9/00
[52] U.S. Cl. .................................. 376/282; 376/299;
376/328; 376/406; 376/911
[58] Field of Search ............... 376/282, 328, 406, 911,
376/299, 298

[56] References Cited

U.S. PATENT DOCUMENTS

| 3,494,828 | 2/1970 | Chave | 376/283 |
| 3,718,539 | 2/1973 | West et al. | 376/283 |
| 3,941,187 | 3/1976 | Jabsen et al. | 376/911 |
| 4,363,780 | 12/1982 | Hannerz | 376/282 |
| 4,526,742 | 7/1985 | Hannerz | 376/282 |
| 4,696,791 | 9/1987 | Straub | 376/282 |
| 4,702,879 | 10/1987 | Tower et al. | 376/282 |

FOREIGN PATENT DOCUMENTS 641208 4/1964 Belgium .
0157321 10/1985 European Pat. Off. .
0246969 11/1987 European Pat. Off. .
2163890 3/1986 United Kingdom .

Primary Examiner—Daniel D. Wasil
Attorney, Agent, or Firm—Fleit, Jacobson, Cohn, Price, Holman & Stern

[57] ABSTRACT

An intrinsic-safety nuclear reactor of the pressurized water type, having:
a reactor vessel (2) equipped with a core (4), a lower header (5) and an upper header (6), at least one heat exchanger (3) with a secondary fluid, means of hydraulic connection (9, 10) between said headers and said heat exchanger and at least one circulation pump (11),
a pressurized container (1) surrounding the reactor vessel (2) and which defines a tank (15) full of a cold, neutron-absorbing liquid;
pipes (20) allowing communication between the lower area of said tank and the lower header of the vessel, as well as pipes (21) allowing communication between the upper area of said tank and the upper header,
in which the pressure drop in the primary fluid across the core is substantially equal to the difference in head between the cold column of said tank and the hot column of the vessel.

The pressurized container (1) is immersed in a pool (18) containing a neutron-absorbing liquid at atmospheric pressure.

10 Claims, 4 Drawing Sheets

INTRINSIC-SAFETY NUCLEAR REACTOR OF THE PRESSURIZED WATER TYPE

BACKGROUND OF THE INVENTION

The subject-matter of this invention consists of an intrinsic-safety nuclear reactor of the pressurized water type.

Canadian patent no. 1.070.860 describes a nuclear reactor of the type with pressurized light water, called the intrinsic-safety type. According to said patent, the vessel containing the reactor core, made of steel and externally insulated, is immersed in a pool provided with its own containment shell. The reactor vessel has at the top an output header for the water which has crossed through the core and got heated, and which, by means of a suitable delivery pipe is conveyed outside the pool to a heat exchanger. From the heat exchanger, the water is conveyed back through a suitable return pipe to an input header located below the core, in the reactor vessel. On the primary circuit return pipe, furthermore, there is a circulation pump. The reactor core, the two headers, the output pipe and the return pipe with the relevant circulation pump, and finally the heat exchanger, form the reactor primary circuit.

In the Canadian patent mentioned above, intrinsic safety is ensured by the fact that the water in the pool is pressurized, and there are means of connection which, in emergency conditions, allow the water from the pool to flow freely into the lower header on the one hand, and means of connection which allow the free flow of the water in the upper header towards the pool, on the other. The emergency conditions envisaged could consist, for example, of a failure of the primary circuit circulation pump, with a consequent increase of the temperature inside the reactor.

The means of connection between the water in the pool and the lower header consist of a pneumatic seal or even an open pipe in which a flow rate of nil is ensured, in normal operating conditions, by means of a suitable play of pressures, as explained below. The means of connection between the upper header and the water of the pool consist of a bell of gas or steam under pressure, installed on top of a fairly high chamber, also full of gas or steam: the height of said chamber must be such that the corresponding head of liquid contained in the pool is equal to the pressure drop in the primary liquid circulating in the reactor. In this way the lower header of the reactor and the surrounding water of the pool are the same pressure, and there is no difference in pressure between the two areas: in spite of the fact that these two areas communicate freely, since their pressures are the same, the flow rate of liquid between one and the other is nil.

In case of failure of the circulation pump, the pressure drop between the lower header and the upper header is eliminated; in particular, the pressure in the upper header increases and the water of the reactor is pushed into the chamber full of gas, and from here into the pool. At the same time, the water from the pool enters the lower header and from here passes into the core. The water of the reactor is therefore replaced by the water from the pool, which is colder: it has already been said that the walls of the reactor are insulated. In addition to this, the water in the pool is borated water so that on reaching the reactor core it gradually stops the reaction.

The volume of water present in the pool is relatively large, and this allows quite a number of hours of primary fluid circulation pump failure without the rector core heating over the pre-established safety limits.

From a strictly technical point of view, the operation of the intrinsic-safety reactor described above and claimed in Canadian patent no. 1.070.860 is unexceptionable. This known reactor, however, has the drawback that it entails a complex construction in the event of using a high-temperature reactor. Indeed, the pressure of the liquid contained in the pool must be higher that the pressure corresponding to the saturation temperature of the fluid on leaving the core, and therefore:

either the quantity of water in the pool is limited, and in this case shut-down of the reactor is ensured but cooling of the core is ensures only in the short term, or the quantity of water in the pool is large, and in this case complex reinforced concrete structures are needed to guarantee containment of said fluid under pressure.

BRIEF SUMMARY OF THE INVENTION

The purpose of the invention described here is to overcome this drawback, allowing construction of a pool with non-pressurized walls, the size of which may be increased at a considerably lower cost than is called for with the Canadian patent mentioned above. According to this invention, the reactor vessel is inserted inside a pressurized metal container which contains a neutron-absorbing liquid under pressure, and which is equipped with all the components called for by the known solution described above.

This pressurized metal container is in turn immersed in a neutron-absorbing fluid, at atmospheric pressure, contained in a large pool equipped with a reinforced concrete containment shell. The neutron-absorbing fluid both inside and outside the pressurized metal container may be borated water. Since this time the pool is not pressurized, its size may be increased at a reasonable cost in relation to the corresponding increase in safety.

In addition to the above, the solution according to the invention allows installation in one single pool of serveral modular-sized reactors; this gives rise to greater operational flexibility, as well as shorter construction times and lower construction costs, due to easy recourse to standardization.

FIG. is a partial cross-section of same, on plane II—II indicated in the preceding figure.

Figure 1:
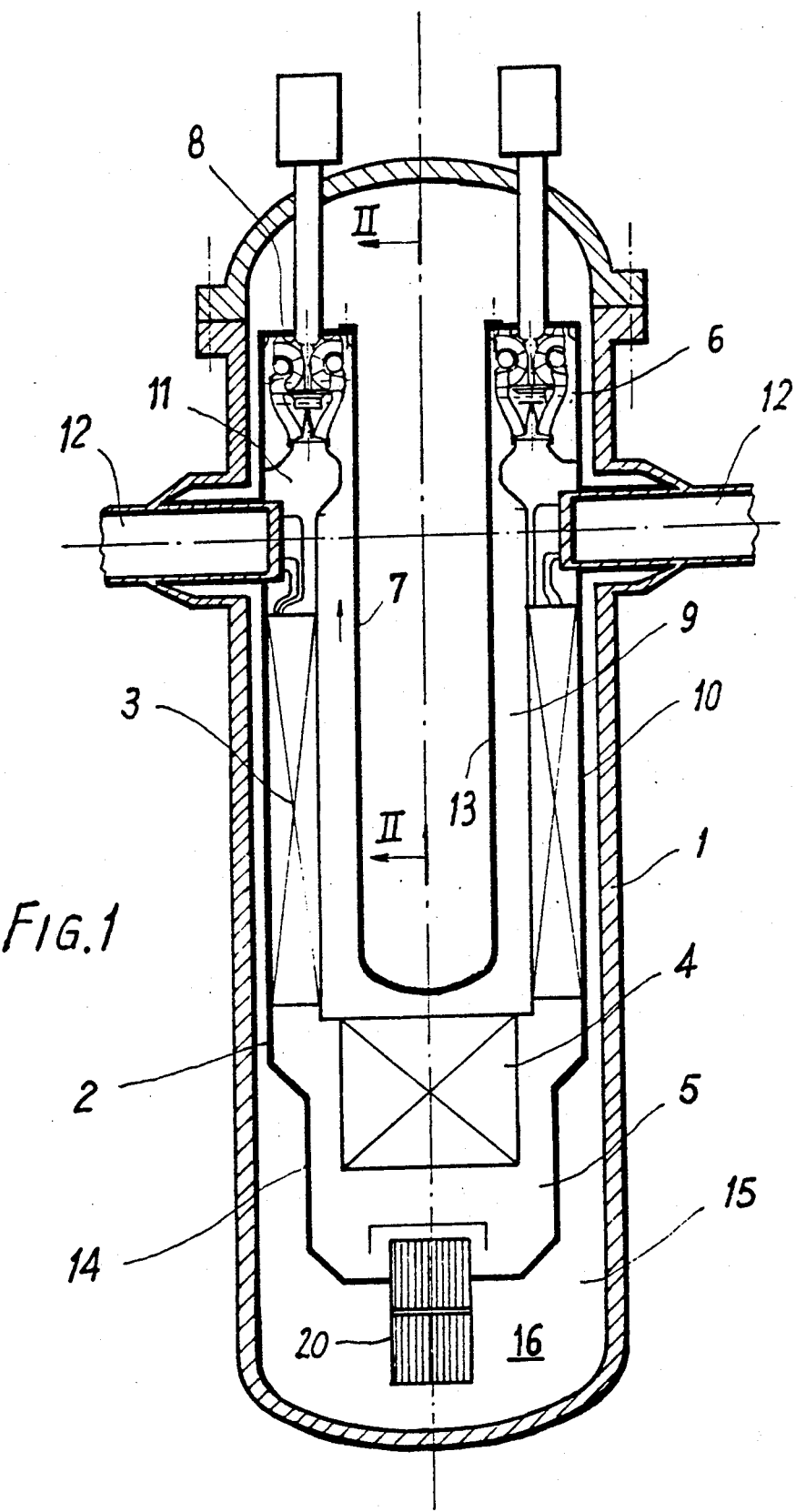
FIG. 1 is a vertical cross-section of a reactor according to the invention in which the pressurized metal container surrounding the reactor vessel is visible.
Figure 2:
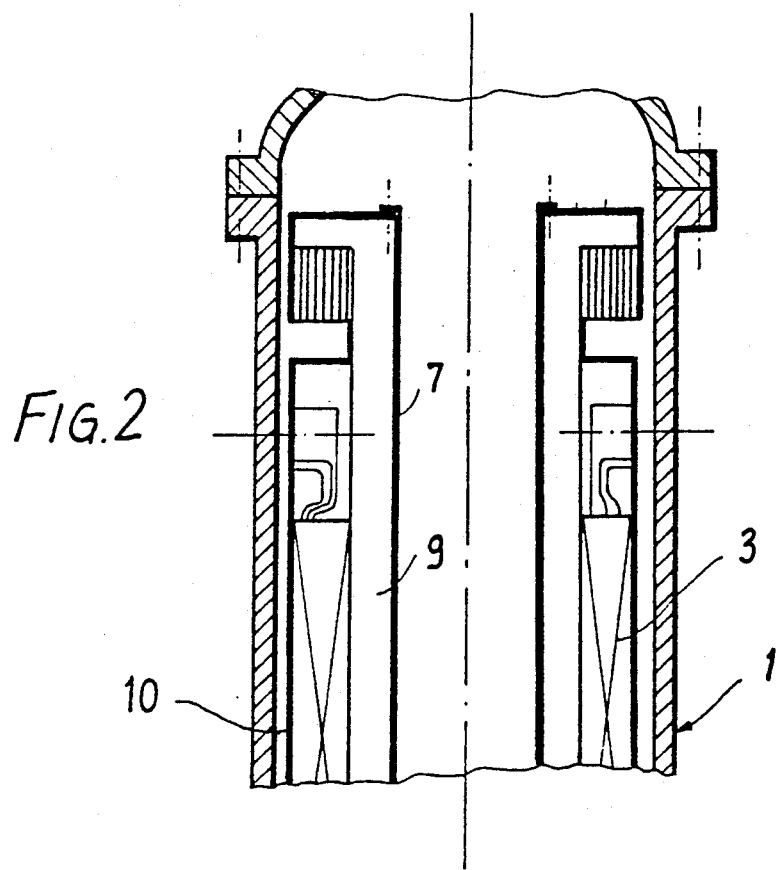
Figure 3:
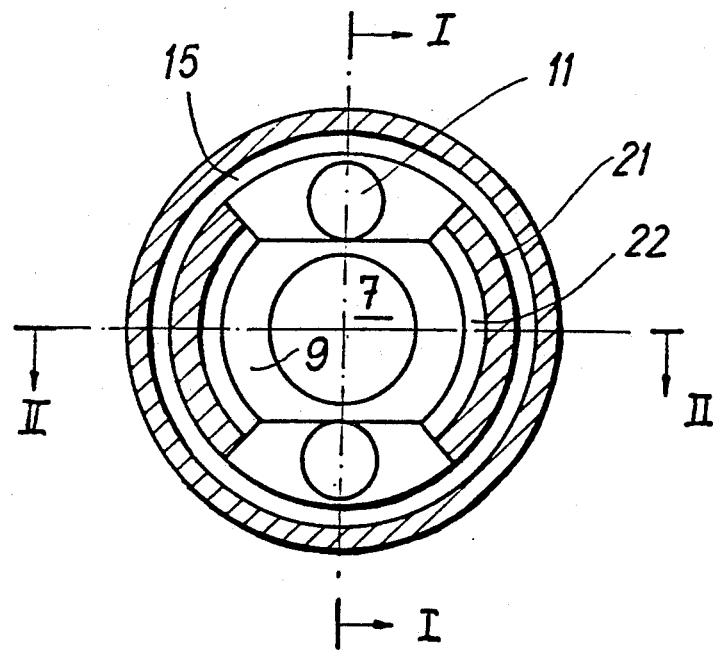

FIG. 3 is a horizontal cross-section on plane III—III indicated in both FIG. 1 and FIG. 2.

Figure 4:
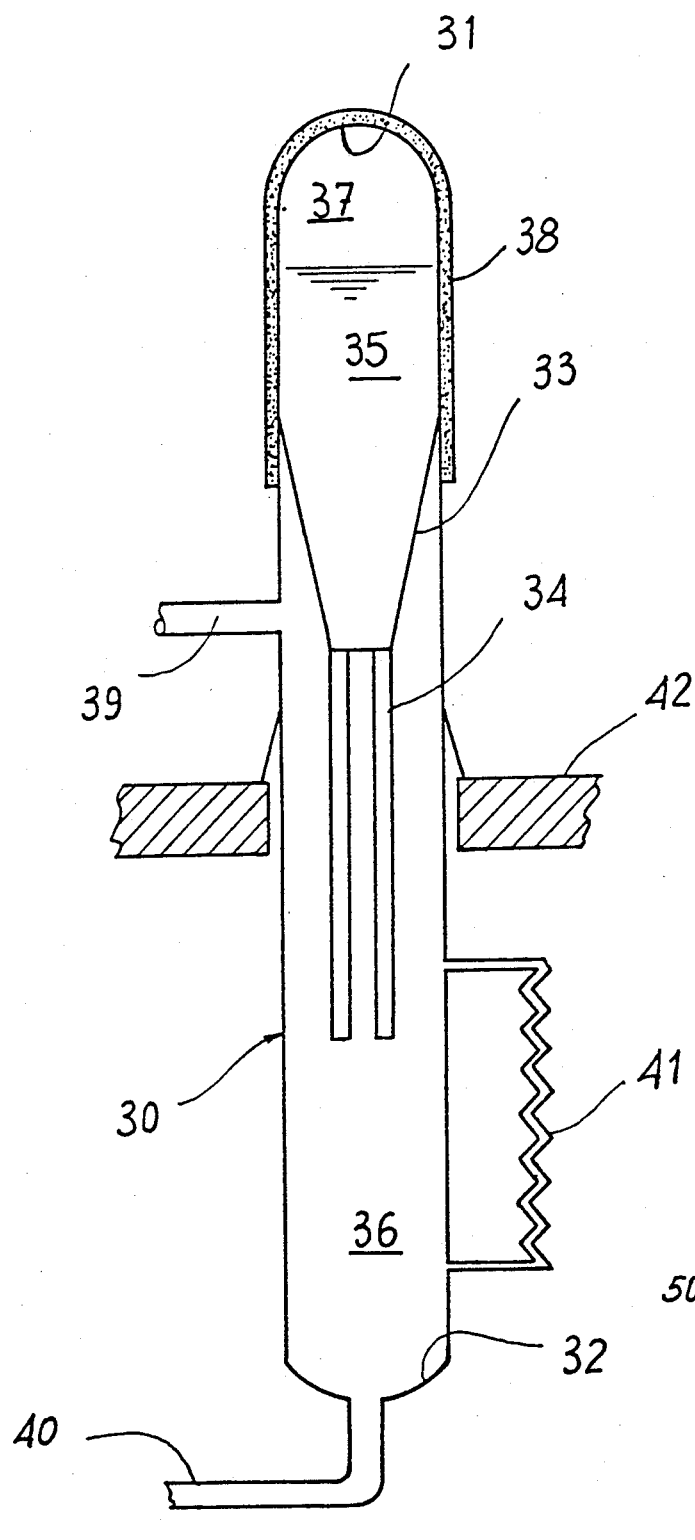

FIG. 4 is a vertical cross-section of a pressurizer used, according to the invention, in conjunction with the pressurized metal container, and whic also acts as an auxiliary cooler.

Figure 5:
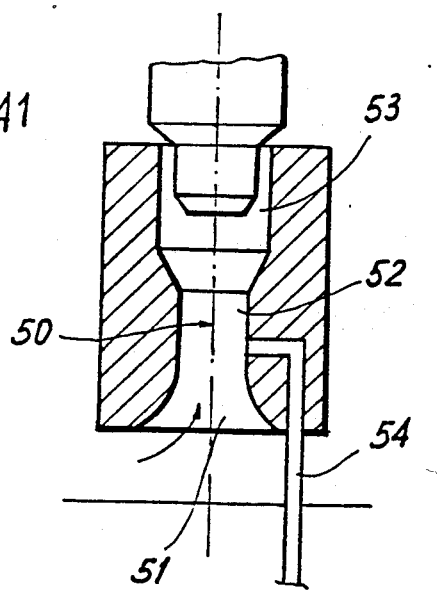

FIG. 5 is a preferred embodiment of the pipes crossing through the core grid.

Figure 6:
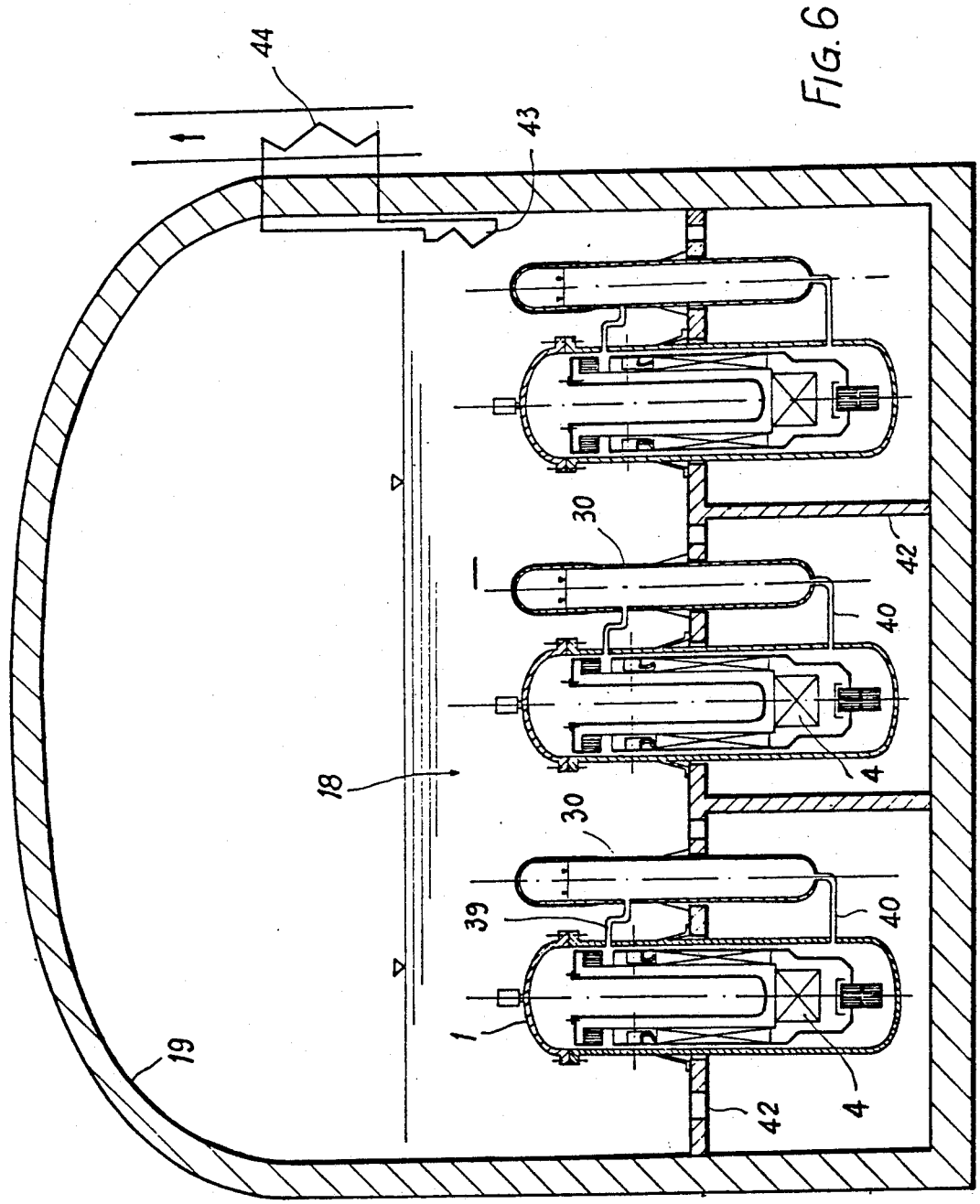

FIG. 6 shows a pool in which, according to the invention, several modular reactors are immersed.

DESCRIPTION OF THE PREFERRED EMBODIMENT

With specific reference to these figures: FIG. 1 indicates a pressurized metal container inside which the vessel 2 of the nuclear reactor is contained; inside the vessel 2, the reactor has a core 4, a lower input header 5, and an upper output header 6.

In the preferred solution illustrated in the figure, the ceiling 8 of the vessel 2 has a cup-shaped structure 7 which defines, inside the vessel 2, a ring-shaped area. This ring-shaped area is split up into two concentric ring-shaped cavities 9 and 10, one acting as an upflow pipe for the hot primary fluid which has crossed through the reactor 4, and one acting as a downflow pipe for the same fluid. At the upper end of the downflow pipe 10 are the circulation pumps 11 which force the hot fluid into the downflow pipe 10, inside which the primary heat exchanger 3 are arranged.

The secondary fluid is fed into and extracted from the primary exchanger 3 through insulated pipes 12, which pass through both the vessel 2 and the pressurized metal container 1.

The outer wall of the reactor vessel 2 is insulated by means of the coating 13-14, only partly shown.

Between the metal container 1 and the reactor vessel 2 there is a tank 15, filled with a neutron-absorbing liquid 16, for instance borated water; in the following description, the term "tank 15" will be used to refer indifferently to this area and to the liquid contained in it. the temperature in the tank 15 is relatively cooler than the temperature of the water contained in reactor vessel 2, thanks to the insulation 13-14 covering the outside wall of the reactor vessel 2; furthermore, the wall of the pressurized container 1 is in contact with the cold water 17 of a non-pressurized pool 18, in which the container is immersed (see FIG. 6).

The lower end of the reactor vessel 2 is penetrated by many pipes 20, for free communication between the lower header 5 and the tank 15. These pipes preferably have an elongated shape, so as to maintain a separating interface (I1) between the liquid in the tank 15 and the liquid in the lower header 5, with no widespread mixing of the two liquids. Maintenance of the I1 interface is ensured by the equal pressures, as was already the case for the Canadian patent mentioned above, and as will be explained again below.

A second series of passages 21 is arranged between the upper header 6 and the upper part of the tank 15. At the top, these pipes 21 lead into an annular shaped bell 22, and at the bottom into the upper part of the tank 15. The annular shaped bell 22 does not necessarily extend for the whole circumference of the reactor vessel 2. The top part of the bell may contain a gas or steam under pressure, or, as explained below, an interface (I2) may be established by means of pipes 21 between the hot liquid contained in vessel 2 and the cold liquid contained, around the latter, in the tank 15, thanks to the different temperatures of the two fluids.

This interface (I2) may be established, together with interface (I1), if the delivery rate of the circulation pumps 11 is such that the pressure drop of the primary fluid in passing through the reactor core is equal to the difference in static head between the column of hot fluid contained in vessel 2 and the column of cold fluid contained in the tank 15, measured in height between interfaces (I1) and (I2).

According to the invention, pressurizing of container 1 may be achieved by means of the pressurizer illustrated in FIG. 4. This consists of an elongated shell 30, closed at the ends by convex bottoms 31 and 32. An internal funnel, 33, is extended downwards by vertical pipes 34, dividing the pressurizer into a hot upper area 35 and a cold lower area 36. The hot area may be created in any expedient manner, for example by using a source of heat to generate a steam cushion 37. Since the pressurizer 30 is immersed in the cold water of the pool 18, the wall of the shell surrounding the hot area 35 is equipped with insulation 38.

A pipe 39 coming out of the pressurizer 30 immediately below the hot area 35 connects the top part of the cold area with the upper area of the tank 15. A second lower pipe 40 connects the bottom of the pressurizer 30 to the lower area of the tank 15. Pipes 39 and 40 allow the pressurizer to function also as an auxiliary cooler for the reactor vessel, as explained further below. To this end, the cold area 36 may be equipped with a liquid-liquid heat-exchanger 41, submerged in the cold water of the pool 18. The purpose of this exchanger is to increase the heat-exchanging surface of the pressurizer wall. If necessary, liquid-liquid heat-exchangers 43 and liquid gas 44 allow natural cooling of the pool 18, by giving up heat into the surrounding ambient air.

Obviously both the various pressurized containers 1 and the pressurizers 30 will be supported by structural elements, schematically illustrated in FIGS. 4 and 6 and indicated as 42.

FIG. 5 illustrates a special form of the channels passing through the grid of the core: each pipe has a lower converging portion 51, a neck 52 which creates a Venturi-type effect, and an upper portion with an increasing cross-section. The neck 52 is linked by a pipe 54 to the area 16. In this case the pipes 54 replace the pipes 20 for hydraulic connection between the cold area 16 and the hot area 5, through pipes 51. This configuration, as explained below, allows the pressure drop in the core to be increased for the same difference in static head between the cold column and the hot column.

To complete the above description, according to this invention it is possible to distinguish between a normally hot primary circuit and a normally cold fluid, contained in the tank 15, kept cold by the exchange of heat with the fluid contained in the pool 18.

As already described, during normal operation of the system there is no appreciable circulation through the natural circulation circuit. This can be achieved by interlocking the circulation pumps 11 with the function of keeping the interface level between the cold water and the hot water in one of the two pipes 20, 21 steady; the choice of the pipe with which the pump is to be interlocked depends on detail technical considerations of a both construction and a control nature. In the following text reference will be made to the upper pipes 21 (represented in FIG. 2 by two hydraulically parallel ducts). The lower pipes 20 are in this case used to compensate the density variations in the primary fluid, as explained below.

According to this invention, the container 1 must be kept pressurized by means of a pressurizing system provided for this specific purpose. According to the form of embodiment illustrated, this system is implemented by means of the pressurizer 30, the upper area of which forms a hot water plenum, while the lower area 30 is simply a cold water plenum.

Pipes 39 and 40 connected to the pressurized container 1 lead to the cold area 36, so that as a result of density fluctuations in the fluid inside container 1, cold water is transferred between container 1 and the pressurizer 30 (FIG. 4), avoiding thermal shocks on the various structures under pressure. The funnel-shaped device indicated as 33 in FIG. 4 produces cooling of the hot water, and then mixing of the hot water with the cold water below it if the level of the hot water drops, and it is therefore capable of reducing the heat gradient on the outer wall of the pressurizer 30 during transient phenomena. The pipes 34 further cool the hot water during transient phenomena corresponding to drops in the level.

In the preferred embodiment of the external pressurizer 30 hydraulically connected to the water of the vessel 15, the flow rate of the water through pipes 39 and 40 must compensate, while the reactor is working, the density variations in the water in the tank 15 and in the water of the primary circuit of the vessel 2. A change in density of the primary circuit water, due for example to a change in the output temperature from the steam generators as a consequence of a different steam demand by the control system, thus entails a change in the level of the hot-cold interface (I1) in the pipes 20. The capacity of the pipes 20 will therefore be suitably sized so as to avoid unwanted entry of borated water into the primary circuit during noormal transient phenomena. Suitable auxiliary systems not part of the plant's safety system will re-establish the correct level of the hot-cold interface (I1) (for example by injecting non-borated water into the primary circuit.) In some accidental transient phenomena, such as if a steam pipe bursts, the rapidity and the extent of the transient heat phenomenon may generate changes in the density of the water in the primary circuit which cannot be compensated by the change in level of the hot-cold front of the connections 20: this benefits safety since any entry of borated water into the primary circuit facilities quenching of the reactor.

According to this invention, safety of the reactor is guaranteed in all conditions without intervention of an automatic nature or by an operator. Indeed, according to this invention, safety of the reactor is ensured by the entry of borated water (15) into the primary circuit each time there is a significant imbalance between the power produced and the power extracted, and each time the recirculation pumps stop.

Removal of the residual heat takes place by a mixing of the primary circuit water with the water of the tank (15), and thus by transmission of the heat to the pool 18 through the wall of container 1, pipes 39 and 40, and pressurizer 30.

Indeed, if the pressurizer has at least two pipes connecting it to the reactor container 1, a naturally circulating flow rate may be established which can transfer heat from the reactor to the cold part of the pressurizer. The thermal capacity of the water in the pool is sufficiently high to absorb the heat produced over several days by all the modules without reaching a temperature of 100° C., and therefore without exerting pressure on the wall 19 surrounding the pool 18.

The temperature of the water in the pool will in any case be kept indefinitely at a temperature below 100° C. by cooling with one or more secondary circuits consisting of a circuit of water circulating naturally between the hot source consisting of a water-water exchanger (43) submerged in the pool and the cold source consisting of a water-air exchanger (44) located outside the containment system, on a higher level than the first exchanger.

The water-air exchanger, which also operates by natural circulation of air, may be of the type claimed under Italian patent no. 1159163, originally envisaged for exchanges between liquid metals and air.

The solution put forward also envisages the possibility of guaranteeing cooling of the core without the intervention of active systems even in the event of breakage of the pressure boundary, whether this occurs at a higher or lower level than the core.

During the first emptying phase, the two volumes of cold water located one in the upper part of container 1 and the other in the lower part of the pressurizer 30 work together to depressurize the system and to keep the core flooded with cold water (at least one of the volumes intervenes, depending on the place of the breakage).

During the second phase of the transient phenomenon, when the level of the water inside the container tends to stabilize, the steam produced by the boiling of the water of the core condenses on the cold parts of the pressure boundary, allowing progressive filling of the latter with water from the pool through the actual crack, by means of the motive force created by the head of water in the pool.

The exchanging surface of the pressure boundary, that is to say of the system 1, 30, 39 and 40, must therefore be sufficient to condense the steam produced at the temperature corresponding to the pressure of the pool water head above the level of the reactor module, if necessary using additional exchangers 41, communicating hydraulically with the water in the tank and in any case immersed in the pool 18.

The outflow of hot water and steam during the first stage of emptying (apart from a partial condensation when passing through the cold water head of the pool) may cause initial pressurizing of the ceiling 19 of the pool 18, which is reduced in time, however, due to interruption of the flow of steam and due to condensation of the steam on the cold surfaces and on the free surface of the water in the pool.

The suitably shaped cup-type structure 7 serves to limit the quantity of hot water present in the primary circuit.

Indeed, this insulated structure allows a sufficient quantity of cold water to be maintained inside it, in communication at the top, with the water in tank 15; convection phenomena ensure that it mixes with the latter and that the heat is removed by dissipation through the insulation 13.

The structure 7 may also be used to support the core instruments and possibly control rods for the core.

To change the fuel, the structure 7 has to be removed, after removing the lid of the container (1).

The loading/unloading machine may then be introduced.

Without having to use the gas cushion in the naturally circulating closed circuit, the moving agent consists of the static pressure differential already defined above.

During the system heating transient, when the static pressure differential due to the different densities of the hot and cold water is not significant, gas may be introduced into the bell (22), as envisaged in the known solution referred to above; during normal operation, the gas may be removed, leaving the natural circulation path (15, 20, 4, 9, 21, 15) perfectly free. During normal operation, this difference in pressure must equal the pressure drop in the core and in the output header; this relationship must be kept in mind in designing the core.

According to a variant of this invention, a Venturi-type narrower cross-section is shaped into the fuel-element feed grid. The main pipe 50 communicates at the bottom with the header 5, while one or more pipes 54 allow the narrower cross-section of the pipe 50 to communicate with the passages 20. With this device a pressure drop in the core which, added to the pressure drop in the header 9, is greater than said static pressure differential pressure is possible without recirculation through the orifice 20.

According to the invention, the solution suggested is particularly suitable for modular systems; the modules (1, 2, 30), may be almost completely shop assembled, and fitted on site into a pool 18, the number of modules varying depending on the power output required. The simplicity of the small number of auxiliary systems required drastically reduces the on-site activities required for plants known up to now.

Finally, it must be pointed out that unlike the Canadian patent cited above, according to this invention only the limited quantity of cold and borated water in the tank 15 has to be kept under pressure: the heat may be transmitted to a large quantity of cold water contained in the pool 18, with no need for any manual or automatic intervention.

This system means that the core may be cooled using only built-in and passive systems.

More generally speaking, according to this invention the reactor module may or may not be equipped with a steam generator having spiral, straight or U-shaped pipes and so on. If it is not, the steam may be produced directly by the core (boiling reactor).

What is claimed is:

1. Intrinsic-safety nuclear reactor of the pressurized-water type comprising:
   a reactor vessel having a core and containing a hot column of a primary fluid,
   a pressurized non-thermally insulated container surrounding the reactor vessel and defining therein a tank having a column of cold first neutron absorbing liquid,
   pipes providing communication between said pressurized container and said vessel, and
   means defining an enclosed pool, containing a second neutron absorbing liquid kept at atmospheric pressure,
   said pressurized container being positioned in said pool and being completely submerged in said second neutron absorbing liquid contained therein.

2. Intrinsic-safety nuclear reactor according to claim 1, further comprising a pressurizer, connection means for hydraulic connection of said pressurizer with said tank, said pressurizer and said connection means being completely submerged in said second neutron absorbing liquid of said pool.

3. Intrinsic-safety nuclear reactor according to claim 2, wherein said connection means comprises two non-thermally insulated conduits, both submerged in said second neutron absorbing liquid of said pool and extending between said pressurizer and said tank at vertically separated levels capable of allowing natural circulation of said first neutron absorbing liquid contained in said tank to and from the pressurizer.

4. Intrinsic-safety nuclear reactor according to claim 2, wherein said pressurizer has a vertically elongated shape defining a hot upper area and a cold lower area, a funnel-shaped wall for separating said hot upper area from said cold lower area, said funnel-shaped wall having a lower part extending downwards towards said cold lower area to allow mixing and cooling of a hot portion of said first neutron absorbing liquid present in the upper area with a cold portion of said first neutron absorbing liquid present in the lower area in the event of a drop in the level of an interface between the hot and cold portions of said first neutron absorbing liquid inside the pressurizer.

5. Intrinsic-safety nuclear reactor according to claim 1, wherein said reactor vessel has an elongated cup-shaped structure removably connected to a top edge of the reactor vessel and axially extending inside the vessel towards the core; whereby the volume for primary fluid inside the vessel is reduced.

6. Intrinsic-safety nuclear reactor of the pressurized type comprising:
   a reactor vessel having a core and containing a hot column of a primary fluid,
   a pressurized non-thermally insulated container surrounding the reactor vessel and defining therein a tank having a column of cold first neutron absorbing liquid,
   a grid for supporting the core,
   vertically extending channels passing through the grid,
   each channel being provided with a lower converging portion, an upper diverging portion and a neck therebetween, to produce a Venturi-type effect on primary fluid passing through the channel,
   a pipe extending from said neck of each channel and opening into said tank, and
   means defining an enclosed pool containing a second neutron absorbing liquid kept at atmospheric pressure,
   said pressurized container being positioned in said pool and being completely submerged in said second neutron absorbing liquid contained therein.

7. Intrinsic-safety nuclear reactor according to claim 6, further comprising a pressurizer, connection means for hydraulic connection of said pressurizer with said tank, said pressurizer and said connection means being completely submerged in said second neutron absorbing liquid of said pool.

8. Intrinsic-safety nuclear reactor according to claim 7, wherein said connection means comprises two non-thermally insulated conduits, both submerged in said second neutron absorbing liquid of said pool and extending between said pressurizer and said tank at vertically separated levels capable of allowing natural circulation of said first neutron absorbing liquid contained in said tank to and from the pressurizer.

9. Intrinsic-safety nuclear reactor according to claim 7, wherein said pressurizer has a vertically elongated shape defining a hot upper area and a cold lower area, a funnel-shaped wall for separating said hot upper area from said cold lower area, said funnel-shaped wall having a lower part extending downwards towards said cold lower area, so as to allow mixing and cooling of a hot portion of said first neutron absorbing liquid present in the upper area with a cold portion of said first neutron absorbing liquid present in the lower area in the event of a drop in level of an interface between the hot and cold portions of said first neutron absorbing liquids inside the pressurizer.

10. Intrinsic-safety nuclear reactor according to claim 6, wherein said reactor vessel is provided with an elongated cup-shaped structure removably connected to a top edge of said reactor vessel and axially extending inside the vessel towards the core, whereby the volume for primary fluid inside the vessel is reduced.

* * * * *